Jan. 12, 1943.     C. F. RYAN     2,307,804
SNAPPING ROLL RELEASE FOR CORN PICKERS AND THE LIKE
Filed April 1, 1940
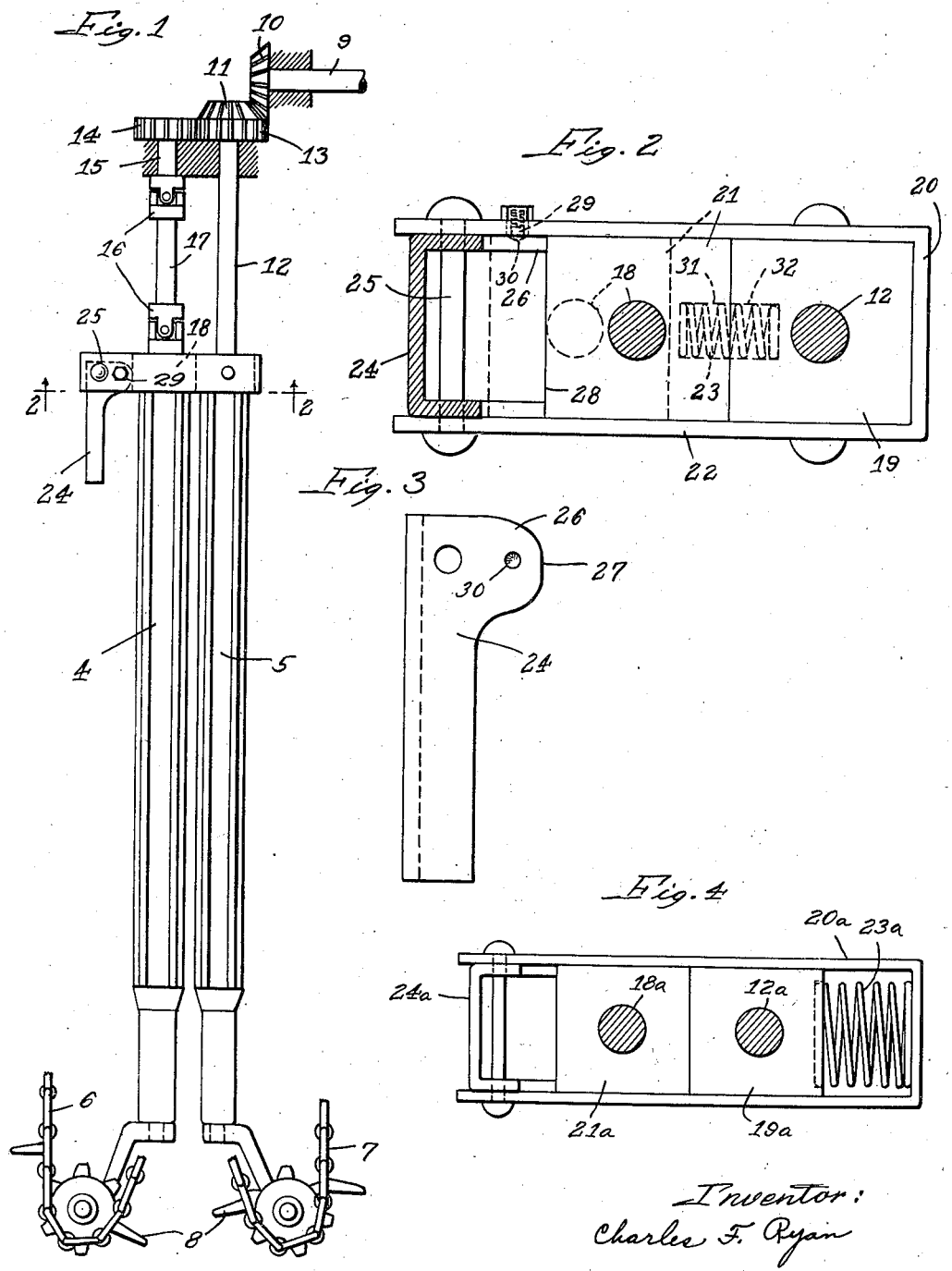
Inventor:
Charles F. Ryan
By
McCanna, Wintercorn & Morsbach
Attys.

Patented Jan. 12, 1943

2,307,804

UNITED STATES PATENT OFFICE 2,307,804

SNAPPING ROLL RELEASE FOR CORN PICKERS AND THE LIKE

Charles F. Ryan, Egan, Ill.

Application April 1, 1940, Serial No. 327,285

14 Claims. (Cl. 56—104)

This invention relates to a snapping roll release for corn pickers and the like.

Farmers have for a long time complained of the difficulty of the snapping rolls clogging and the innumerable serious accidents which have resulted where efforts were made to clear out the stalks without stopping the machine. Most farmers, recognizing the danger, have taken the risk rather than to have to waste so much time and work under added difficulty in trying to clear out the stalks with the rolls stationary and the stalks wedged tightly therebetween, because, after all, the work would not be done by machine if it were not for the fact that it permits a saving in time and labor. The manufacturers of corn pickers and the like, while doubtlessly well aware of the problem for many years, have either been unable to solve it or have not seen fit to make any changes, perhaps for fear of adding too much to the cost of the machine.

It is therefore the principal object of my invention to provide a simple and inexpensive and yet thoroughly practical release for the snapping rolls, which will permit quick separation of the rolls so that any stalks clogging the same may be quickly cleared out without stopping the machine and without danger of injury to the operator. The release, in accordance with my invention, is also so designed that in the case of those machines which depend upon rolls operating in timed relation to one another, the rolls after release are returned to normal operating relationship without any disturbance as to timing.

The invention is illustrated in the accompanying drawing, in which—

Figure 1 is a view of a portion of a corn picker or the like showing a pair of snapping rolls equipped with my improved release;

Fig. 2 is a sectional view on the line 2—2 of Fig. 1, on a larger scale;

Fig. 3 is a side view of the release lever by itself, and

Fig. 4 is another sectional view, similar to Fig. 2 but showing a modified or alternative construction.

Similar reference numerals are applied to corresponding parts in these views.

4 and 5 designate the snapping rolls, and at 6 and 7 are indicated the ends of the conventional traveling chains equipped with fingers 8 for holding the stalks upright until the snapping rolls take hold, it being well known that as the stalks are drawn down through the snapping rolls, the ears are snapped off and fall into the elevator, which takes them to the husking rolls. 9 designates the shaft for driving the snapping rolls 4 and 5 and, whereas in the ordinary unimproved machine, the one roll is driven directly from the shaft through bevel gears and the other roll is driven from the first roll by intermeshing gears on the two rolls, such an arrangement would not be suitable where the rolls are to be separated as in my invention. I, therefore, provide bevel gears 10 and 11 for driving the shaft 12 from the shaft 9, whereby to drive the roll 5, and I provide constantly meshed spur gears 13 and 14 for driving the shaft 15 from the shaft 12, the shaft 15 being connected through universal joints 16 and an intermediate shaft 17 with the shaft 18 for driving the roll 4. That permits retracting roll 4 in relation to roll 5 and thereafter returning it to normal operating relationship to roll 5 without changing its timed relationship thereto. The shafts 9, 12, and 15 are shown supported in a predetermined spaced relationship to one another in bearings on the frame of the machine, the bearings appearing in section.

My improved release for the rolls 4 and 5 comprises a stationary or fixed bearing 19 for the shaft 12 in a U-shaped frame 20, and another bearing 21 for the shaft 18 movable toward and away from the bearing 19 between the arms 22 of the U-shaped frame, together with spring means indicated at 23 normally tending to urge the bearing 21 away from the bearing 19, and a release lever 24 for moving the bearing 21 into operative abutting relation with the bearing 19 and holding it in such position, the lever 24 being quickly and easily movable to and from the normal operative position shown and being pivoted on the pintle 25 passing through the ends of the arms 22 of the U-shaped frame 20 with the cam portions 26 of the released lever disposed between said arms in engagement with the adjacent side of the bearing 21. The cam portions 26 of the release lever 24 have small flats 27 provided on the crown thereof, which have surface to surface engagement with the flat side 28 of the bearing 21 when the bearing is held in abutment with the bearing 19 and the lever 24 is approximately in a dead center position relative to the bearing 21 and pivot 25, thus minimizing the danger of the lever 24 accidentally releasing the bearing 21. However, I contemplate providing a spring pressed ball detent on at least one arm 22 of the frame 20 arranged to engage in a depression 30 in the adjacent cam portion 26 of the release lever when the same is moved to the dead center position, whereby to hold the lever securely in its normal operative position while nevertheless permitting reasonably easy release of said lever whenever it is desired to separate the snapping rolls 4 and 5. The fact that the spring means 23 constantly urges the bearing 21 toward the release lever 24 also helps to keep the lever more securely locked, that is, the lever is not as apt to release accidentally due to vibration as it might when not held resiliently in locked position. The spring means 23 is suitably a single coiled compression spring housed in registering sockets 31 provided therefor in the adjoining sides of the bearings 19 and 21, the spring being secured at one end, as at 32, in the inner end of one of said sockets so that there is no danger of its dropping out when the rolls are released. The snapping roll release means, of which the release lever 24 is the manually operable part, is referred to in the claims as a "dead-center" type means by reason of the fact that the lever moves approximately to a dead center position relative to the bearing 21 and pivot 25 when releasably securing the bearings 19 and 21 in normal operating relationship.

The operation of the release is thought to be evident from the foregoing description. Obviously if the snapping rolls can be separated handily, as herein disclosed, there is no particular danger attached to the clearing out of stalks when the rolls get clogged, even though the machine is not stopped. If a farmer prefers, he may stop the machine, and the rolls may be cleared easily when separated in accordance with my invention, although it is not thought to be at all necessary to stop the machine when the same is equipped with my improved release, inasmuch as the danger attached to the fixedly spaced rolls of the conventional design is entirely eliminated with my invention. Only the upper ends of the rolls need separation, that being the point where the clogging occurs, although, of course, the release features illustrated could, if desired, be applied to both ends of the roll 4.

In the construction shown in Fig. 4, 12a is the relatively fixed shaft and 18a the movable shaft, the shaft 12a being mounted in bearing 19a and shaft 18a in bearing 21a. 20a is a U-shaped frame, the cross-portion of which cooperates with a coiled compression spring 23a to compress it between the frame and the bearing 19a when the release lever 24a pivoted in the frame 20a on the opposite side of the pair of bearings 19a and 21a is moved to the dead center position, slidably engaging the bearing 21a. Thus, the spring 23a urges the rolls together but allows them to separate against the spring pressure to whatever slight degree may be necessary in normal operation, the spring further serving to hold the lever 24a resiliently in locked position so that there is less likelihood of its releasing accidentally. When the lever 24a is released, the bearing 21a is retractable relative to the bearing 19a so as to separate the snapping rolls, one of which, like roll 5, turns with the shaft 12a, and the other of which, like roll 4, turns with the shaft 18a. The spring 23a, it will be understood, does not have as much throw as the release lever 24a and, therefore, when the latter is released, there is sufficient play in the assembly to allow the shafts 12a and 18a to be separated enough to clear out stalks from between the rolls easily, whether the machine is running or stopped, the operation being relieved of the usual dangers even if the rolls are driven during the operation, so long as they are separated in accordance with the invention. It is, of course, understood that with the arrangement of Fig. 4, the rolls will be operated otherwise in the same manner as in Fig. 1 so that the timed relationship is not disturbed by separation of the rolls.

It is believed the foregoing description conveys a good understanding of the objects and advantages of my invention. The appended claims have been drawn to cover all legitimate modifications and adaptations.

I claim:

1. In a machine of the character described, the combination of a pair of cooperating snapping rolls normally disposed substantially parallel to one another in a predetermined closely spaced relationship, means for driving said rolls, relatively fixed bearings for one of said rolls, bearings for the other of said rolls at least one of which is movable toward and away from the adjacent bearing of the first roll, and manually operable dead-center type means in combination with the last named bearings for quickly releasably securing the same in a normal close relationship whereby the movable bearing is adapted to be moved to retracted position for immediate separation of the rolls when desired.

2. A machine as set forth in claim 1, including spring means cooperating with the movable bearing for urging the movable bearing toward retracted position.

3. In a machine of the character described, the combination of a pair of cooperating snapping rolls normally disposed substantially parallel to one another in a predetermined closely spaced relationship, means for driving said rolls, relatively fixed bearings for one of said rolls, bearings for the other of said rolls at least one of which is movable toward and away from the adjacent bearing of the first roll, a frame providing spaced, substantially parallel side members rigid with respect to the relatively fixed bearing and having the relatively movable bearing movable therebetween, and a manually operable cam pivotally mounted between the side members adjacent the movable bearing and in remote relation to the fixed bearing and arranged when turned in one direction to an extreme dead-center position to engage the movable bearing slidably and move it to operative position adjacent the fixed bearing and hold the same in such position, said cam when turned in the opposite direction to an opposite extreme position providing clearance between the cam and movable bearing so that the latter is free to move to retracted position relative to the fixed bearing.

4. A machine as set forth in claim 3, including a coiled compression spring compressed between the bearings when the movable bearing is in operative relationship to the fixed bearing, said spring acting to move the movable bearing to retracted position upon operation of the cam to a limit position.

5. A machine as set forth in claim 3, including a coiled compression spring compressed between the bearings when the movable bearing is in operative relationship to the fixed bearing, said spring acting to move the movable bearing to retracted position upon operation of the cam to a limit position, said spring being housed in registering sockets provided therefor in adjacent sides of the bearings and having means for securing the spring at one end in the socket of one of said bearings.

6. A machine as set forth in claim 3, including spring means tending normally to move the movable bearing to retracted position relative to the fixed bearing, and a spring pressed detent acting between one of the frame side members and the cam, said detent being mounted on one of said relatively movable parts and arranged to engage in a recess procided in the other of said parts to hold the cam releasably approximately in a dead center position with respect to the movable bearing.

7. In a machine of the character described, the combination of a pair of cooperating snapping rolls normally disposed substantially parallel to one another in a predetermined closely spaced relationship, means for driving said rolls, relatively fixed bearings for one of said rolls, bearings for the other of said rolls at least one of which is movable toward and away from the adjacent bearing of the first roll, a frame providing spaced substantially parallel side members on opposite sides of the last named bearings and movable with respect thereto transversely relative to the rolls, spring means tending normally to move said frame in one direction, and a manually operable cam pivotally mounted between the side members adjacent the movable bearing and in remote relation to the fixed bearing, and arranged when turned to an extreme position to engage the movable bearing slidably and move it to operative position adjacent the fixed bearing and hold the same in such position, said cam when turned to an opposite extreme position providing clearance between the cam and movable bearing so that the latter is free to move to retracted position relative to the fixed bearing.

8. In a machine of the character described, the combination of a pair of cooperating snapping rolls adapted to operate in a predetermined timed relation to one another normally in substantially parallel closely spaced relationship, two shafts for driving said rolls rotatably mounted in bearings on said machine in a predetermined spaced relationship, gears connecting said shafts, means for driving one of said gears, one of said shafts being directly connected with one of said rolls supported in relatively fixed bearings in said machine, an intermediate shaft flexibly connected with the other of said shafts on one end and flexibly connected at the other end with the other of said rolls to drive the latter in timed relation with the first-mentioned roll, bearings for said second-mentioned roll at least one of which is movable toward and away from the adjacent bearing of the first roll, and manually operable dead-center type means in combination with the last-named bearings for quickly releasably securing the same in a normal close relationship, whereby the movable bearing is adapted to be moved to a retracted position for immediate separation of the rolls when desired.

9. A machine as set forth in claim 8, including spring means cooperating with the movable bearing for urging the same toward retracted position.

10. A machine as set forth in claim 8, including spring means for urging the rolls together, said spring means being so arranged with respect to the manually operable dead-center type means as to be brought into operative relationship with the rolls when the dead-center type means is operated to releasably secure the bearings in close relationship.

11. A machine as set forth in claim 8, including spring means in combination with the last-named bearings on the opposite side of said bearings from said manually operable dead-center type means, said spring means normally holding the bearings in close relationship but permitting separation thereof against the action of said spring means, and said dead-center type means acting positively to move one of said bearings into close relationship with the other bearing but when released permitting the bearings and rolls to be separated independently of said spring means.

12. In a machine of the character described, the combination of a pair of cooperating snapping rolls normally disposed substantially parallel to one another in a predetermined closely spaced relationship, means for driving said rolls, bearings for one end of said rolls, other bearings for the other end of said rolls movable relative to one another, a frame providing spaced, substantially parallel side members on opposite sides of said last-named bearings with relation to which said bearings are movable, spring means in one end of said frame acting against one of said bearings to urge it toward the other of said bearings whereby said bearings are normally resiliently held in close relationship but are adapted to be separated against the action of said spring means, and a manually operable cam pivotally mounted between the side members of the frame at the other end thereof and slidably engaging the other of said bearings to move the same positively toward the first bearings and hold the same in close relationship therewith until said cam is turned to a retracted position when the bearings are separable independently of said spring means.

13. A safety release for corn picker snapping rolls comprising in combination with a pair of snapping rolls having means for driving the same in opposite directions, spring means for urging the rolls apart, a lever having means thereon for holding said rolls together in one position of said lever, said lever being pivotally mounted for manual movement through approximately 90° from said position to release said rolls to permit separation thereof under the action of said spring means.

14. A safety release for corn picker snapping rolls comprising in combination with a pair of snapping rolls having means for driving the same in opposite directions, spring means for urging the rolls together, a lever having means thereon for holding said rolls together in one position of said lever, said lever being pivotally mounted for manual movement of approximately 90° from said position to release said holding means and release said spring means to permit separation of said rolls.

CHARLES F. RYAN.